Patented Feb. 14, 1928.

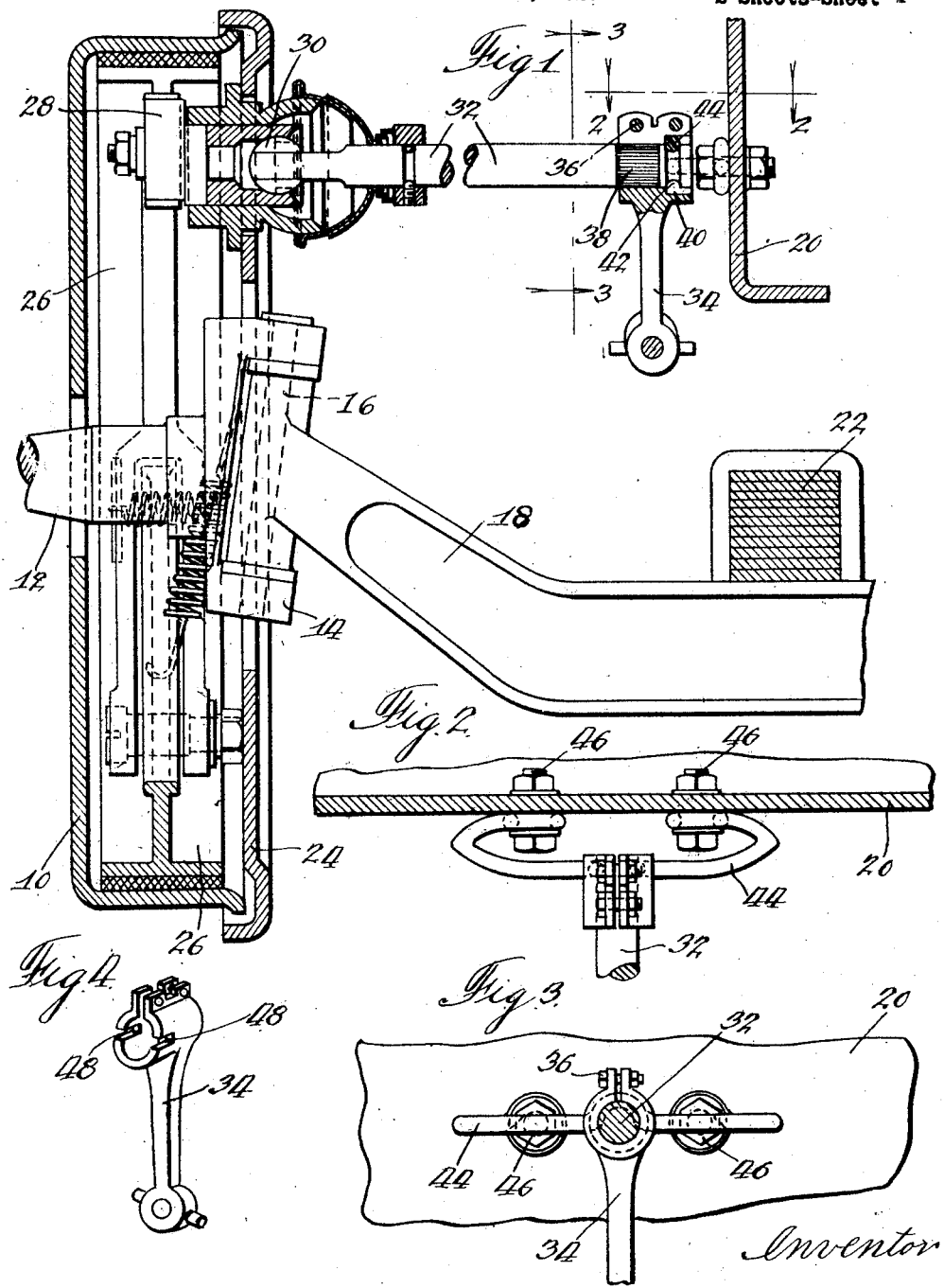

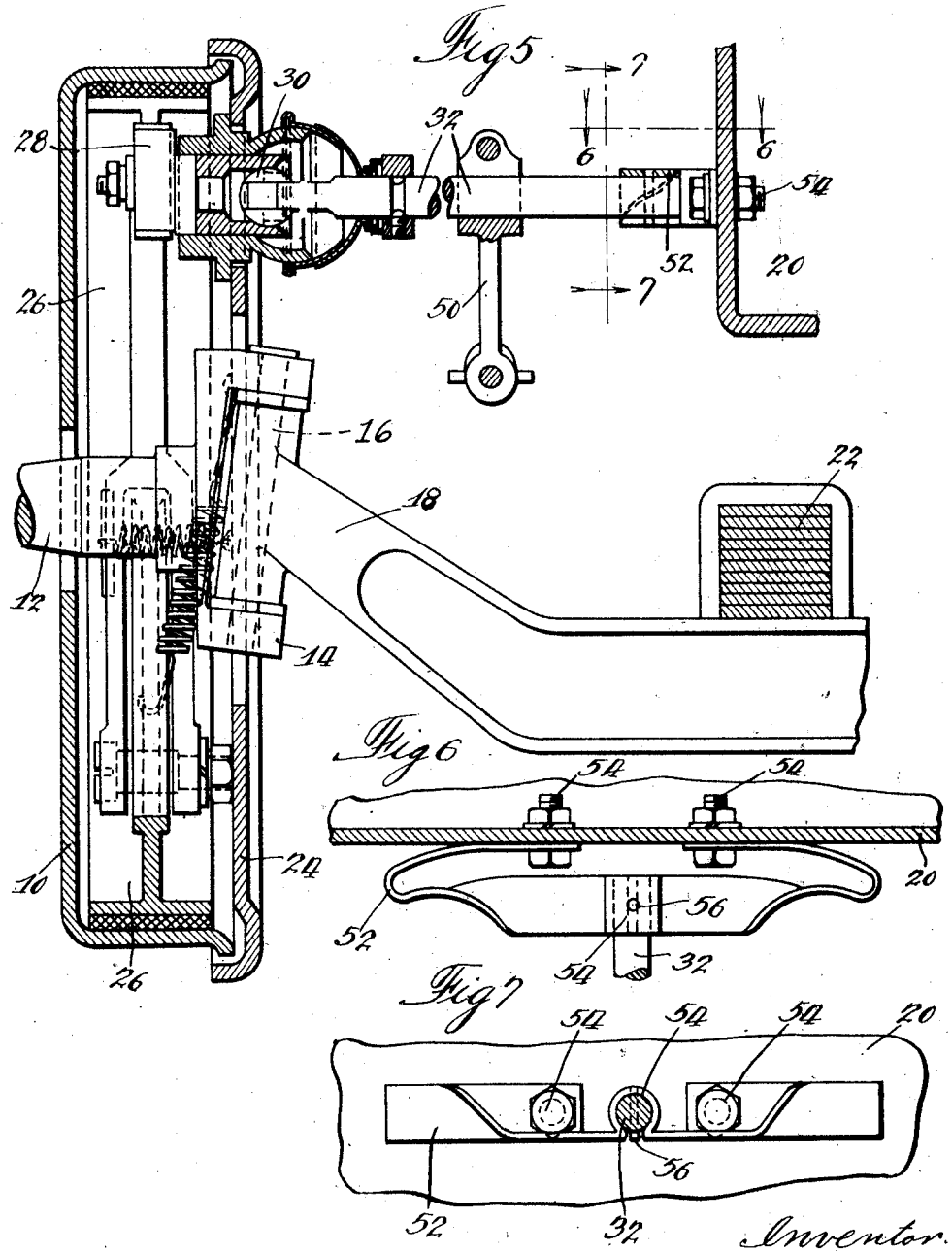

1,659,369

UNITED STATES PATENT OFFICE.

KENNETH E. LYMAN, OF CHICAGO, ILLINOIS, ASSIGNOR TO BENDIX BRAKE COMPANY, OF CHICAGO, ILLINOIS, A CORPORATION OF ILLINOIS.

BRAKE-OPERATING MECHANISM.

Application filed June 7, 1927. Serial No. 197,181.

This invention relates to brakes, and is illustrated as embodied in novel operating mechanism for a front wheel automobile brake. An object of the invention is to provide a strong but inexpensive support for the chassis end of the brake-applying shaft, which can flex to permit the shaft to oscillate up and down and to move lengthwise, thus compensating for movement of the vehicle springs.

In one desirable arrangement, the spring is bowed at its ends, which ends are preferably secured to the chassis frame, and is provided between its ends with shaft-supporting means which in itself embodies substantial novelty.

The above and other objects and features of the invention will be apparent from the following description of two illustrative embodiments shown in the accompanying drawing, in which:

Figure 1 is a vertical section through one front brake, and associated parts, showing the brake-applying shaft in front elevation;

Figure 2 is a partial section on the line 2—2 of Figure 1, showing the novel shaft support in top plan;

Figure 3 is a partial section on the line 3—3 of Figure 2, showing the novel support in elevation;

Figure 4 is a perspective view of an improved shaft-operating arm arranged to interconnect the shaft end and the spring support;

Figure 5 is a vertical section corresponding to Figure 1, but showing a modified form of support;

Figure 6 is a partial section on the line 6—6 of Figure 5, showing the support in top plan; and Figure 7 is a partial section on the line 7—7 of Figure 5, showing the support in elevation.

Each of the illustrated brakes includes a rotatable drum 10, mounted with a wheel (not shown) on the spindle 12 of a knuckle 14 swivelled, by a king-pin 16 or the like, at one end of an axle 18. Axle 18 supports the chassis frame 20, through the usual springs 22. The open side of drum 10 may be closed by the usual backing plate 24.

The friction means of the brake may include shoes 26, shown as applied by a double cam 28 operated through a universal joint 30 by a brake-operating shaft 32 terminating adjacent the chassis frame 20 at its inner end.

Except as further described below, the above-identified parts or their equivalents may be of any desired construction. The present invention relates to supporting the chassis end of the shaft 32.

In the arrangement of Figures 1-4, the shaft 32 is operated by a lever or arm 34, having a split hub surrounding and contracted by a clamp screw 36 about a serrated portion 38 of the shaft. The hub of lever 34 is formed with an internal groove 40, registering with a groove 42 at the end of shaft 32, and receiving a semicircular loop or offset on a novel support 44 formed of a spring having looped resilient ends secured to the chassis frame 20 by bolts 46. The spring 44 is preferably round in cross-section, and enters the recess defined by grooves 40 and 42 through notches 48 in the hub of lever 34.

In the arrangement of Figures 5-7, shaft 32 is operated by a lever or arm 50 secured thereto in any desired manner, and is supported at its chassis end by a novel leaf spring or flat metal support 52 having looped ends (with the flat surfaces extending vertically) secured to the chassis frame by bolts 54. Between the looped ends, spring 52 is twisted into a horizontal plane, and formed with a loop or circular offset 54 receiving the end of shaft 32, to which it may be secured, if desired, by means such as a key or pin 56.

While two illustrative embodiments have been described in detail, it is not my intention to limit the scope of the invention to those particular embodiments, or otherwise than by the terms of the appended claims.

I claim:

1. A support for the chassis end of a brake-applying shaft, comprising a bowed spring, means for securing both ends of the spring to the chassis frame, and means between the ends of the spring for supporting the shaft end.

2. A support for the chassis end of a brake-applying shaft, comprising a spring, means for securing spaced portions of the spring to the chassis frame, and means between said portions of the spring for rotatably supporting the shaft end.

3. A support for the chassis end of a brake-applying shaft, comprising a spring having both ends looped around for engagement with the chassis frame, and having a shaft support between said ends.

4. A support for the chassis end of a brake-applying shaft, comprising a spring having looped ends and arranged to be secured to the chassis frame, and having a shaft support between said ends.

5. A support for the chassis end of a brake-applying shaft, comprising a spring having looped ends and arranged to be secured to the chassis frame, in combination with an operating lever interconnecting the shaft and the spring.

6. A support for the chassis end of a brake-applying shaft, comprising a spring having looped ends and arranged to be secured to the chassis frame, in combination with an operating lever having a hub secured to the shaft and supported by the spring.

7. A support for the chassis end of a brake-applying shaft having a groove adjacent said end, comprising an operating lever having a hub secured to the shaft and encircling said groove, and a spring support in the groove held in place by said hub.

8. A support for the chassis end of a brake-applying shaft, comprising an elongated flexible member having both ends secured to the chassis frame and having an intermediate portion formed to provide a shaft-supporting portion.

9. A support for the chassis end of a brake-applying shaft, comprising a spring secured to the chassis frame at spaced points and having a shaft supporting device between said points.

In testimony whereof, I have hereunto signed my name.

KENNETH E. LYMAN.